(12) United States Patent
Chang et al.

(10) Patent No.: US 8,971,232 B2
(45) Date of Patent: Mar. 3, 2015

(54) APPARATUS AND METHOD FOR SUPPORTING HETEROGENEOUS SYSTEMS IN MULTI-HOP RELAY BROADBAND WIRELESS COMMUNICATION SYSTEM

(75) Inventors: Young-Bin Chang, Anyang-si (KR); Taori Rakesh, Suwon-si (KR); Hyun Jeong Kang, Seoul (KR); Jung-Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1023 days.

(21) Appl. No.: 12/419,439

(22) Filed: Apr. 7, 2009

(65) Prior Publication Data
US 2009/0252082 A1 Oct. 8, 2009

(30) Foreign Application Priority Data

Apr. 7, 2008 (KR) .................. 10-2008-0032403

(51) Int. Cl.
| | |
|---|---|
| H04B 7/204 | (2006.01) |
| H04W 72/04 | (2009.01) |
| H04B 7/26 | (2006.01) |
| H04W 16/26 | (2009.01) |
| H04W 84/04 | (2009.01) |

(52) U.S. Cl.
CPC ......... *H04W 72/0493* (2013.01); *H04B 7/2606* (2013.01); *H04W 16/26* (2013.01); *H04W 84/047* (2013.01)

USPC ............................................ 370/315; 455/16

(58) Field of Classification Search
USPC .................. 370/315, 338, 336, 352; 455/76
See application file for complete search history.

(56) References Cited

U.S. PATENT DOCUMENTS

| | | | | |
|---|---|---|---|---|
| 2008/0095195 | A1* | 4/2008 | Ahmadi et al. | ............... 370/478 |
| 2010/0278123 | A1* | 11/2010 | Fong et al. | .................... 370/329 |
| 2011/0014877 | A1* | 1/2011 | Cho et al. | ......................... 455/70 |
| 2011/0096715 | A1* | 4/2011 | Park et al. | ..................... 370/315 |

* cited by examiner

*Primary Examiner* — Donald Mills
*Assistant Examiner* — Henry Baron
(74) *Attorney, Agent, or Firm* — Jefferson IP Law, LLP

(57) ABSTRACT

An apparatus and method for supporting heterogeneous systems in a multi-hop relay wireless communication system are provided. In a method of transmitting and receiving a Down-Link (DL) frame of a Base Station (BS) in a multi-hop relay wireless communication system employing heterogeneous systems, the DL frame of the BS includes a legacy zone for communication with a legacy Mobile Station (MS), an access zone of a new zone for communication with a new MS, and a relay zone of the new zone for communication with a new Relay Station (RS). The method includes transmitting DL data to the legacy MS in the legacy zone, transmitting the DL data to the new MS in the access zone of the new zone, and transmitting the DL data to the new RS in the relay zone of the new zone.

14 Claims, 18 Drawing Sheets

APPARATUS AND METHOD FOR SUPPORTING HETEROGENEOUS SYSTEMS IN MULTI-HOP RELAY BROADBAND WIRELESS COMMUNICATION SYSTEM

PRIORITY

This application claims the benefit under 35 U.S.C. §119 (a) of a Korean patent application filed in the Korean Intellectual Property Office on Apr. 7, 2008 and assigned Serial No. 10-2008-0032403, the entire disclosure of which is hereby incorporated by reference.

BACKGROUND OF THE INVENTION

1. Field of the Invention

The present invention relates to an apparatus and method for supporting heterogeneous systems in a multi-hop relay broadband wireless communication system. More particularly, the present invention relates to an apparatus and method for performing communication according to a frame structure capable of simultaneously supporting heterogeneous systems in a multi-hop relay broadband wireless communication system.

2. Description of the Related Art

A next generation communication system (i.e., a $4^{th}$ Generation (4G) communication system) aims to provide various Qualities of Service (QoS) with a data rate of about 100 Mbps. In particular, the 4G communication system has evolved to ensure mobility and QoS in a Broadband Wireless Access (BWA) communication system (e.g., a Local Area Network (LAN) system, a Metropolitan Area Network (MAN) system, etc.). A representative example of the communication system includes an Institute of Electrical and Electronics Engineers (IEEE) 802.16d communication system and an IEEE 802.16e communication system.

The IEEE 802.16d communication system and the IEEE 802.16e communication system use an Orthogonal Frequency Division Multiplexing (OFDM)/Orthogonal Frequency Division Multiple Access (OFDMA) scheme for a physical channel.

In a conventional IEEE 802.16e communication system, signaling communication is performed between a fixed Base Station (BS) and a Mobile Station (MS) through a direct link. Therefore, a wireless communication link may be established with high reliability between the BS and the MS. However, since the BS has a fixed location in the IEEE 802.16e communication system, a wireless network structure has low flexibility. Accordingly, it is difficult to provide an effective communication service in a wireless environment where traffic distribution and call demands rapidly change.

To address such a disadvantage, a data delivery method using a multi-hop relay scheme may be used in a conventional cellular wireless communication system (e.g., the IEEE 802.16e communication system) by the use of a fixed Relay Station (RS), a mobile RS, or an MS. The multi-hop relay wireless communication system may reconfigure a network by rapidly handling changes of a communication environment, and may further effectively manage an overall wireless network. For example, the multi-hop relay wireless communication system may extend cell coverage area and increase system capacity. That is, when a channel condition is poor between a BS and an MS, an RS may be installed between the BS and the MS to configure a multi-hop relay path via the RS. Therefore, a wireless channel having an improved channel condition may be provided to the MS. In addition, the multi-hop relay scheme may be used in a cell boundary area where a channel condition from the BS is poor, and thus a high-speed data channel may be provided and the cell coverage area may be extended.

In the multi-hop relay wireless communication system, a BS may use a relay service of an RS to provide a communication service to an MS located outside the coverage area of the BS. In order to provide the relay service, a specific time at which data is transmitted by the BS, the RS, and the MS needs to be indicated by defining a physical frame structure.

A DownLink (DL) frame and an UpLink (UL) frame of the BS are divided into an access zone and a relay zone. In an access zone of the DL frame, the BS or the RS transmits data to the MS, and in a relay zone of the DL frame, the BS transmits DL data, which is used to provide a relay service to the MS, to the RS. In addition, in an access zone of the UL frame, the MS transmits data to the BS or the RS, and in a relay zone of the UL frame, the RS transmits UL data, which is used to provide a relay service to the MS, to the BS.

As described above, multi-hop relay communication may be achieved by using the RS. However, the multi-hop relay communication scheme may be used only when the BS, the RS, and the MS correspond to the same system. If at least one of the BS, the RS, and the MS corresponds to two or more wireless systems, the multi-hop relay communication scheme may not be used.

Wireless communication systems evolve to provide a high-speed data service in comparison with a legacy system or to address an implementation issue. In such a system evolution process, various systems may coexist in the same area according to a degree of compatibility with the legacy system. For example, a new system evolved from the legacy system may be installed in an area where an IEEE 802.16e system (i.e., legacy system) is installed. In this case, the new system must be able to provide services not only to a legacy MS but also to a new MS. In other words, when an MS corresponding to the legacy system coexists with an MS corresponding to the new system, there is a need for a frame structure capable of providing services to the two MSs.

SUMMARY OF THE INVENTION

An aspect of the present invention is to address at least the above-mentioned problems and/or disadvantages and to provide at least the advantages described below. Accordingly, an aspect of the present invention is to provide an apparatus and method for supporting heterogeneous systems in a multi-hop relay broadband wireless communication system, and a frame structure thereof.

Another aspect of the present invention is to provide an apparatus and method for providing services to both a Mobile Station (MS) corresponding to a legacy system and an MS corresponding to a new system in a multi-hop relay broadband wireless communication system, and a frame structure thereof.

Another aspect of the present invention is to provide an apparatus and method in which a Base Station (BS) of a new system provides services to both an MS of the new system and an MS of a legacy system by using a Relay Station (RS) of the new system in a multi-hop relay broadband wireless communication system, and a frame structure thereof.

In accordance with an aspect of the present invention, a method of transmitting and receiving a DownLink (DL) frame of a BS in a multi-hop relay wireless communication system using OFDMA (Orthogonal Frequency Division Multiple Access) scheme employing heterogeneous systems is provided. The DL frame of the BS includes a legacy zone for communication with a legacy MS, an access zone of a new zone for communication with a new MS, and a relay zone of the new zone for communication with a new RS. The method includes transmitting DL data to the legacy MS in the legacy zone, transmitting the DL data to the new MS in the access zone of the new zone, and transmitting the DL data to the new RS in the relay zone of the new zone, wherein the heterogeneous systems include a legacy system for supporting the legacy MS and a new system for supporting the new MS and the new RS and the new system is evolved from the legacy system with supporting compatibility of the legacy system.

In accordance with another aspect of the present invention, a method of transmitting and receiving a DL frame of an RS in a multi-hop relay wireless communication system using OFDMA (Orthogonal Frequency Division Multiple Access) scheme employing heterogeneous systems is provided. The DL frame of the RS includes a legacy zone for communication with a legacy MS, an access zone of a new zone for communication with a new MS, and a relay zone of a new zone for communication with a new BS. The method includes transmitting DL data to the legacy MS in the legacy zone, transmitting the DL data to the new MS in the access zone of the new zone, and receiving the DL data, which is to be delivered to the new MS, from the new BS in the relay zone of the new zone, wherein the heterogeneous systems include a legacy system for supporting the legacy MS and a new system for supporting the new MS and the new RS and the new system is evolved from the legacy system with supporting compatibility of the legacy system.

In accordance with another aspect of the present invention, a method of transmitting and receiving an UpLink (UL) frame of a BS in a multi-hop relay wireless communication system using OFDMA (Orthogonal Frequency Division Multiple Access) scheme employing heterogeneous systems is provided. The UL frame of the BS includes a legacy zone for communication with a legacy MS, an access zone of a new zone for communication with a new MS, and a relay zone of a new zone for communication with a new RS. The method includes receiving UL data from the legacy MS in the legacy zone, receiving the UL data from the new MS in the access zone of the new zone, and receiving the UL data from the new RS in the relay zone of the new zone, wherein the heterogeneous systems include a legacy system for supporting the legacy MS and a new system for supporting the new MS and the new RS and the new system is evolved from the legacy system with supporting compatibility of the legacy system.

In accordance with another aspect of the present invention, a method of transmitting and receiving a UL frame of an RS in a multi-hop relay wireless communication system using OFDMA (Orthogonal Frequency Division Multiple Access) scheme employing heterogeneous systems is provided. The UL frame of the RS includes a legacy zone for communication with a legacy MS, an access zone of a new zone for communication with a new MS, and a relay zone of a new zone for communication with a new BS. The method includes receiving UL data from the legacy MS in the legacy zone, receiving the UL data from the new MS in the access zone of the new zone, and transmitting the UL data, which is to be delivered to the new MS, to the new BS in the relay zone of the new zone, wherein the heterogeneous systems include a legacy system for supporting the legacy MS and a new system for supporting the new MS and the new RS and the new system is evolved from the legacy system with supporting compatibility of the legacy system.

In accordance with another aspect of the present invention, an apparatus for transmitting and receiving a DL frame of a BS in a multi-hop relay wireless communication system using OFDMA (Orthogonal Frequency Division Multiple Access) scheme employing heterogeneous systems is provided. The DL frame of the BS includes a legacy zone for communication with a legacy MS, an access zone of a new zone for communication with a new MS, and a relay zone of the new zone for communication with a new RS. The apparatus includes a frame generator for generating DL data to be transmitted to the legacy MS in the legacy zone, for generating DL data to be transmitted to the new MS in the access zone of the new zone, and for generating DL data to be transmitted to the new RS in the relay zone of the new zone, and a transmitter for transmitting the generated DL data, wherein the heterogeneous systems include a legacy system for supporting the legacy MS and a new system for supporting the new MS and the new RS and the new system is evolved from the legacy system with supporting compatibility of the legacy system.

In accordance with another aspect of the present invention, an apparatus for transmitting and receiving a DL frame of an RS in a multi-hop relay wireless communication system using OFDMA (Orthogonal Frequency Division Multiple Access) scheme employing heterogeneous systems is provided. The DL frame of the RS includes a legacy zone for communication with a legacy MS, an access zone of a new zone for communication with a new MS, and a relay zone of a new zone for communication with a new BS. The apparatus includes a frame generator for generating DL data to be transmitted to the legacy MS in the legacy zone and for generating DL data to be transmitted to the new MS in the access zone of the new zone, a transmitter for transmitting the generated data, a receiver for receiving the data, and a frame extractor for extracting the DL data, which is received from the new BS in the relay zone of the new zone, from the received data, wherein the heterogeneous systems include a legacy system for supporting the legacy MS and a new system for supporting the new MS and the new RS and the new system is evolved from the legacy system with supporting compatibility of the legacy system.

In accordance with another aspect of the present invention, an apparatus for transmitting and receiving a UL frame of a BS in a multi-hop relay wireless communication system using OFDMA (Orthogonal Frequency Division Multiple Access) scheme employing heterogeneous systems is provided. The UL frame of the BS includes a legacy zone for communication with a legacy MS, an access zone of a new zone for communication with a new MS, and a relay zone of a new zone for communication with a new RS. The apparatus includes a receiver for receiving data, and a frame extractor for extracting UL data received from the legacy MS in the legacy zone, for extracting UL data received from the new MS in the access zone of the new zone, and for extracting UL data received from the new RS in the relay zone of the new zone, from the received data, wherein the heterogeneous systems include a legacy system for supporting the legacy MS and a new system for supporting the new MS and the new RS and the new system is evolved from the legacy system with supporting compatibility of the legacy system.

In accordance with another aspect of the present invention, an apparatus for transmitting and receiving a UL frame of an RS in a multi-hop relay wireless communication system using OFDMA (Orthogonal Frequency Division Multiple Access) scheme employing heterogeneous systems is provided. The UL frame of the RS includes a legacy zone for communication with a legacy MS, an access zone of a new zone for communication with a new MS, and a relay zone of a new zone for communication with a new BS. The apparatus includes a receiver for receiving data, a frame extractor for extracting UL data received from the legacy MS in the legacy zone and for extracting UL data received from the new MS in the access zone of the new zone, from the received data, and a transmitter for transmitting the UL data, which is received from the new MS, to the new BS in the relay zone of the new zone, wherein the heterogeneous systems include a legacy system for supporting the legacy MS and a new system for supporting the new MS and the new RS and the new system is evolved from the legacy system with supporting compatibility of the legacy system.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
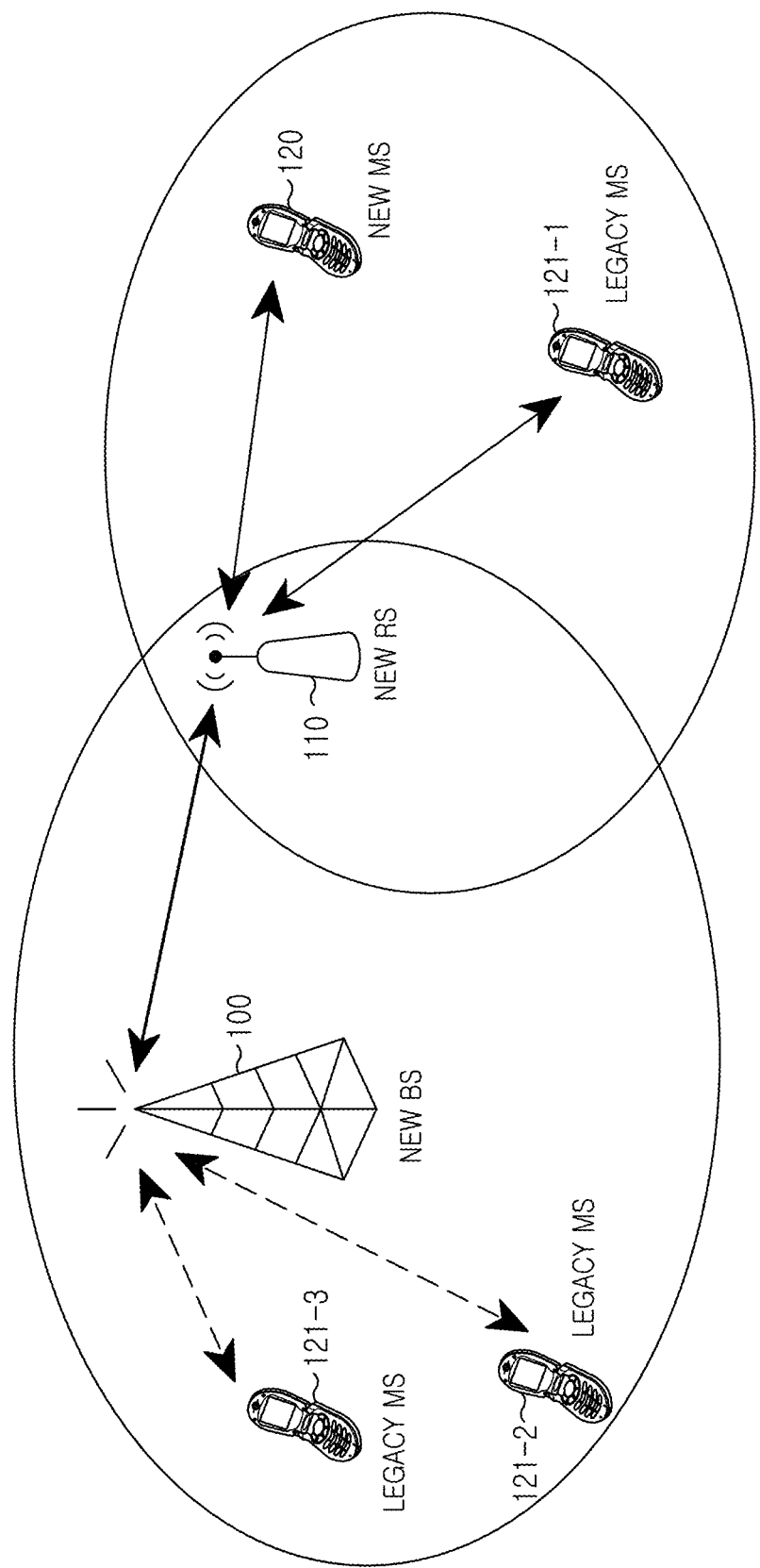
FIG. 1 illustrates a broadband wireless communication system in which entities corresponding to different standards coexist, according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention will be described below with reference to the accompanying drawings. In the following description, well-known functions or constructions are not described in detail since they would obscure the invention in unnecessary detail.

Exemplary embodiments of the present invention include an apparatus and method for supporting heterogeneous systems in a multi-hop relay broadband wireless communication system, and a frame structure thereof. In particular, exemplary embodiments of the present invention include an apparatus and method, whereby a Base Station (BS) of a new system provides services to both a Mobile Station (MS) of the new system and an MS of a legacy system by using a Relay Station (RS) of the new system, and a frame structure thereof.

The multi-hop relay broadband wireless communication system may be a communication system using an Orthogonal Frequency Division Multiplexing (OFDM)/Orthogonal Frequency Division Multiple Access (OFDMA) scheme. Since the multi-hop relay broadband wireless communication system uses the OFDM/OFDMA scheme, a plurality of subcarriers may be used to transmit physical-channel signals to achieve high-speed data transmission, and a multi-cell structure may be used to support mobility of an MS.

Although the broadband wireless communication system is described hereinafter as an example, the present invention may equally apply to any cellular-based communication systems as long as the systems use a multi-hop relay scheme.

For convenience of explanation, an MS corresponding to a legacy system is referred to as a "legacy MS", an MS corresponding to a new system is referred to as a "new MS". In addition, a BS corresponding to the new system is referred to as a "new BS", and an RS corresponding to the new system is referred to as a "new RS". For example, the legacy MS may be an Institute of Electrical and Electronics Engineers (IEEE) 802.16e-based MS (or 16e MS). The new MS may be an IEEE 802.16m-based MS (or 16m MS). The new BS may be an IEEE 802.16m-based BS (or 16m BS). The new RS may be an IEEE 802.16m-based RS (or 16m RS).

FIG. 1 illustrates a broadband wireless communication system in which entities corresponding to different standards coexist according to an exemplary embodiment of the present invention. In particular, in FIG. 1, a new RS is introduced to provide a relay service to a legacy MS in a new multi-hop relay broadband wireless communication system.

Referring to FIG. 1, the new broadband wireless communication system includes a new BS (i.e., 16m BS) 100, a new RS (i.e., 16m RS) 110, and a new MS (i.e., 16m MS) 120. Further, the new BS 100 may provide communication services to both the new MS 120 and legacy MSs (i.e., 16e MSs) 121-1, 121-2, and 121-3. When the new MS 120 and the legacy MSs 121-1, 121-2, and 121-3 are located outside the coverage area of the new BS 100, data of the new MS 120 and the legacy MSs 121-1, 121-2, and 121-3 may be delivered by using a relay service of the new RS 110.

Figure 2:
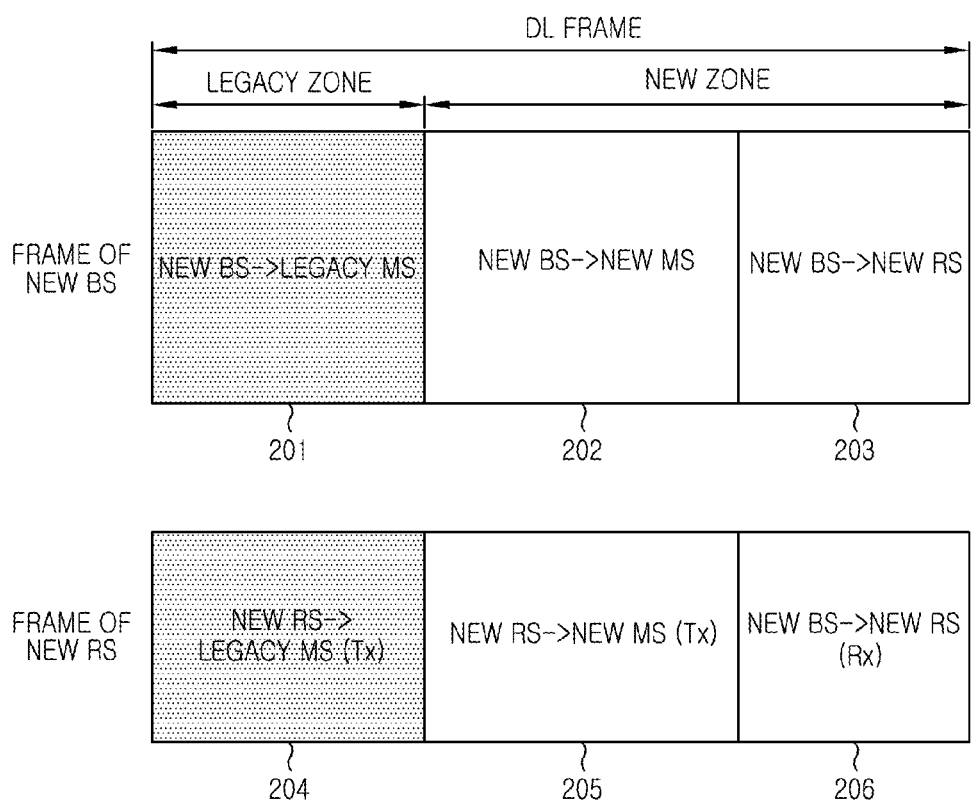
FIG. 2 illustrates a DownLink (DL) frame structure of a new Base Station (BS) and a new Relay Station (RS) for providing services to both a new Mobile Station (MS) and a legacy MS in a multi-hop relay broadband wireless communication system according to an exemplary embodiment of the present invention.

FIG. 2 illustrates a DownLink (DL) frame structure of a new BS and a new RS for providing services to both a new MS and a legacy MS in a multi-hop relay broadband wireless communication system according to an exemplary embodiment of the present invention. In FIGS. 2-11, a horizontal axis represents a time domain, and a vertical axis represents a frequency domain.

Referring to FIG. 2, a DL frame of the new BS is divided into a legacy zone for communication with entities of a legacy wireless communication system and a new zone for communication with entities (i.e., entities corresponding to the same standard as the BS) of a new wireless communication system. The legacy zone includes an access zone 201, wherein the new BS (i.e., 16m BS) transmits DL data to the legacy MS (i.e., 16e MS) corresponding to the legacy communication system. The new zone of the DL frame is divided into an access zone 202 and a relay zone 203. In the access zone 202, the new BS (i.e., 16m BS) transmits data to the new MS (i.e., 16m MS) corresponding to substantially the same wireless communication system as the new BS. In the relay zone 203, the new BS transmits DL data, which is used to provide a relay service to the new MS (i.e., 16m MS), to the new RS (i.e., 16m RS) corresponding to substantially the same wireless communication system as the new BS.

Similarly, a DL frame of the new RS (i.e., 16m RS) is divided into a legacy zone and a new zone. The new zone is divided into an access zone 205 and a relay zone 206. The legacy zone includes an access zone 204, wherein the new RS (i.e., 16m RS) transmits DL data to the legacy MS (i.e., 16e MS). In the access zone 205 of the new zone, the new RS (i.e., 16m RS) transmits data to the new MS (i.e., 16m MS). In the relay zone 206 of the new zone, the new RS receives DL data, which is used to provide a relay service to the new MS (i.e., 16m MS), from the new BS (i.e., 16m BS).

Figure 3:
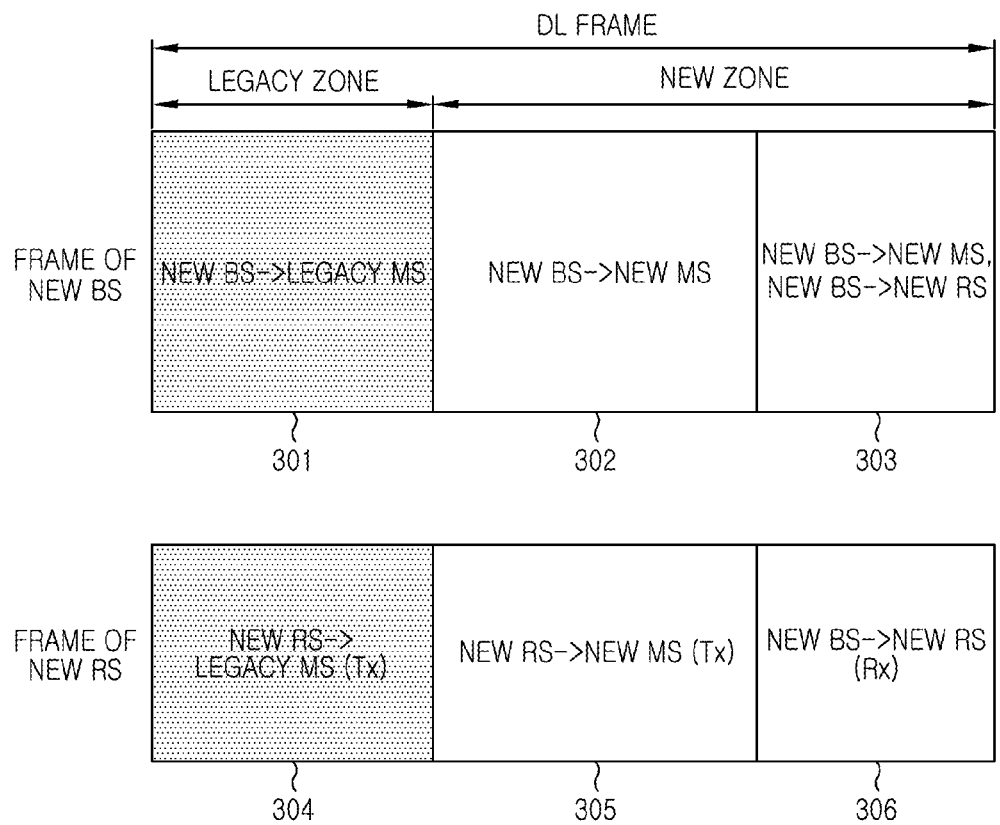
FIG. 3 illustrates a DL frame structure of a new BS and a new RS for providing services to both a new MS and a legacy MS in a multi-hop relay broadband wireless communication system according to another exemplary embodiment of the present invention.

FIG. 3 illustrates a DL frame structure of a new BS and a new RS for providing services to both a new MS and a legacy MS in a multi-hop relay broadband wireless communication system according to another exemplary embodiment of the present invention.

Referring to FIG. 3, DL frames of the new BS (i.e., 16m BS) and the new RS (i.e., 16m RS) are similar to the DL frames of the new BS (i.e., 16m BS) and the new RS (i.e., 16m RS) of FIG. 2. For example, legacy access zones 201 and 204, new access zones 202 and 205, and new relay zone 206 of FIG. 2 are substantially the same as legacy access zones 301 and 304, new access zones 302 and 305, and new relay zone 306 of FIG. 3, respectively. However, unlike the relay zone 203 in FIG. 2, in a relay zone 303 of a new zone, the new BS (i.e., 16m BS) transmits DL data, which is used to provide a relay service to a new MS (i.e., 16m MS), not only with the new RS (i.e., 16m RS) but also with the new MS (i.e., 16m MS).

Figure 4:
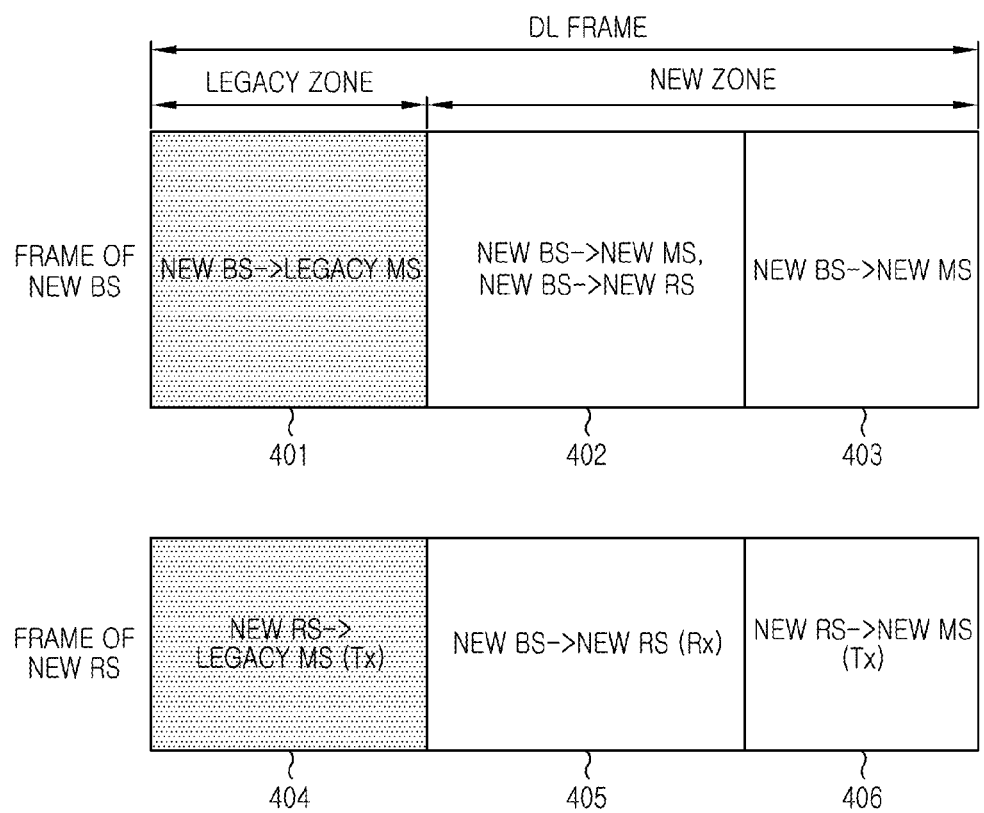
FIG. 4 illustrates a DL frame structure of a new BS and a new RS for providing services to both a new MS and a legacy MS in a multi-hop relay broadband wireless communication system according to yet another exemplary embodiment of the present invention.

FIG. 4 illustrates a DL frame structure of a new BS and a new RS for providing services to both a new MS and a legacy MS in a multi-hop relay broadband wireless communication system according to yet another exemplary embodiment of the present invention.

Referring to FIG. 4, DL frames of the new BS (i.e., 16m BS) and the new RS (i.e., 16m RS) are similar to the DL frames of the new BS (i.e., 16m BS) and the new RS (i.e., 16m RS) of FIG. 3. For example, legacy access zones 301 and 304 of FIG. 3 are substantially the same as legacy access zones 401 and 404 of FIG. 4, respectively. However, in the DL frames of the new BS (i.e., 16m BS) and the new RS (i.e., 16m RS), locations of an access zone and a relay zone within a new zone are opposite to their corresponding locations in FIG. 3. Accordingly, new access zones 302 and 305, and new relay zones 303 and 306 of FIG. 3 correspond to new access zones 403 and 406, and new relay zones 402 and 405 of FIG. 4, respectively.

Figure 5:
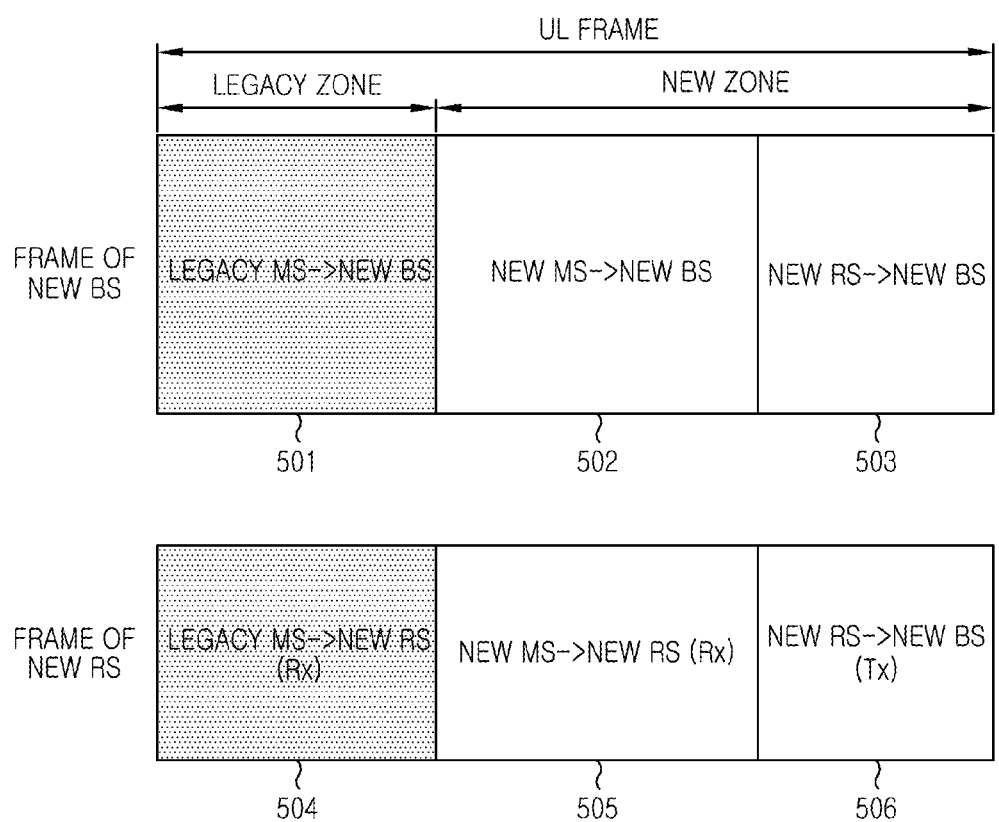
FIG. 5 illustrates an UpLink (UL) frame structure of a new BS and a new RS for providing services to both a new MS and a legacy MS in a multi-hop relay broadband wireless communication system according to an exemplary embodiment of the present invention.

FIG. 5 illustrates an UpLink (UL) frame structure of a new BS and a new RS for providing services to both a new MS and a legacy MS in a multi-hop relay broadband wireless communication system according to an exemplary embodiment of the present invention.

Referring to FIG. 5, a UL frame of the new BS (i.e., 16m BS) is divided into a legacy zone for communication with entities of a legacy wireless communication system and a new zone for communication with entities of substantially the same wireless communication system as the new BS. The legacy zone includes an access zone 501, wherein the legacy MS (i.e., 16e MS) corresponding to the legacy communication system transmits UL data to the new BS (i.e., 16m BS). The new zone is divided into an access zone 502 and a relay zone 503. The legacy zone includes an access zone 501, wherein the new BS (i.e., 16m BS) receives UL data from the legacy MS (i.e., 16e MS). In the access zone 502 of the new zone, the new BS (i.e., 16m BS) receives UL data from the new MS (i.e., 16m MS) corresponding to substantially the same wireless communication system as the new BS (i.e., 16m BS). In the relay zone 503 of the new zone, the new BS receives the UL data of the new MS (i.e., 16m MS) and UL data, which is used to provide a relay service to the new MS (i.e., 16m MS), from the new RS (i.e., 16m RS).

Similarly, a UL frame of the new RS (i.e., 16m RS) is divided into a legacy zone and a new zone. The new zone is divided into an access zone 505 and a relay zone 506. The legacy zone includes an access zone 504, wherein the new RS (i.e., 16m RS) receives UL data from the legacy MS (i.e., 16e MS). In the access zone 505 of the new zone, the new RS (i.e., 16m RS) receives data from the new MS (i.e., 16m MS). In the relay zone 506 of the new zone, the new RS transmits the UL data of the new MS (i.e., 16m MS) and UL data, which is used to provide a relay service to the new MS (i.e., 16m MS), to the new BS (i.e., 16m BS).

Figure 6:
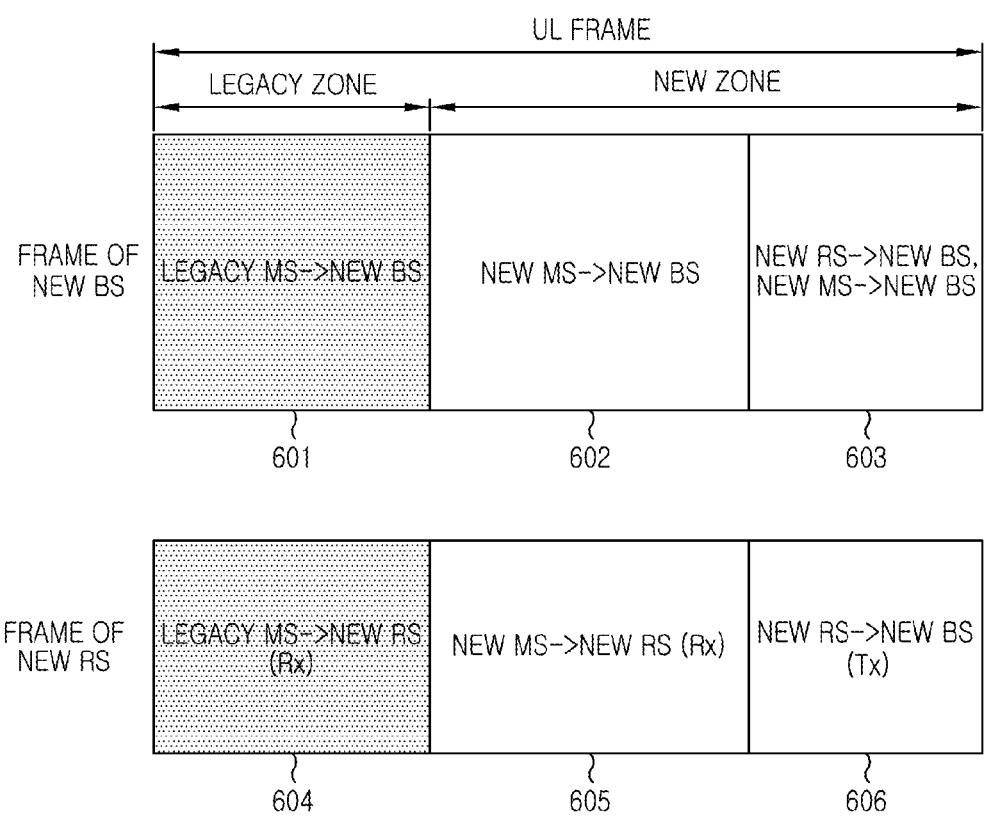
FIG. 6 illustrates a UL frame structure of a new BS and a new RS for providing services to both a new MS and a legacy MS in a multi-hop relay broadband wireless communication system according to another exemplary embodiment of the present invention.

FIG. 6 illustrates a UL frame structure of a new BS and a new RS for providing services to both a new MS and a legacy MS in a multi-hop relay broadband wireless communication system according to another exemplary embodiment of the present invention.

Referring to FIG. 6, UL frames of the new BS (i.e., 16m BS) and the new RS (i.e., 16m RS) are similar to the UL frames of the new BS (i.e., 16m BS) and the new RS (i.e., 16m RS) of FIG. 5. For example, legacy access zones 501 and 504, new access zones 502 and 505, and new relay zone 506 of FIG. 5 are substantially the same as legacy access zones 601 and 604, new access zones 602 and 605, and new relay zone 606 of FIG. 6, respectively. However, unlike the relay zone 503 in FIG. 5, in the relay zone 603 of the new zone, the new BS (i.e., 16m BS) receives the UL data of the new MS (i.e., 16m MS) and UL data, which is used to provide a relay service to the new MS (i.e., 16m MS), not only from the new RS (i.e., 16m RS) but also from the new MS (i.e., 16m MS).

Figure 7:
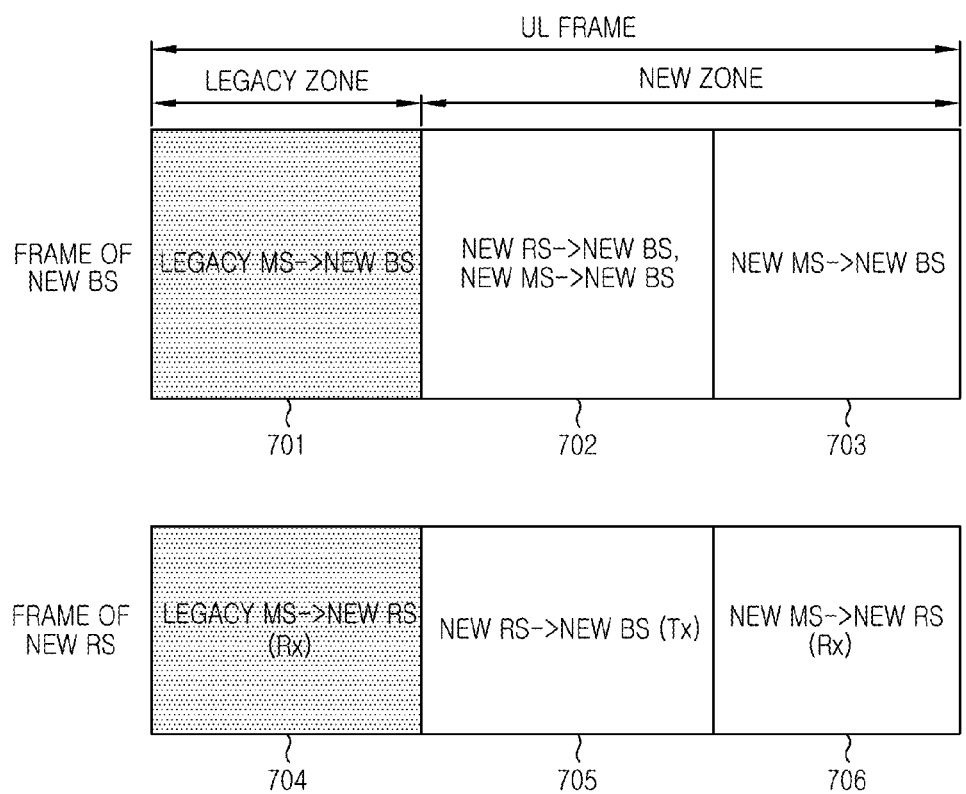
FIG. 7 illustrates a UL frame structure of a new BS and a new RS for providing services to both a new MS and a legacy MS in a multi-hop relay broadband wireless communication system according to yet another exemplary embodiment of the present invention.

FIG. 7 illustrates a UL frame structure of a new BS and a new RS for providing services to both a new MS and a legacy MS in a multi-hop relay broadband wireless communication system according to yet another exemplary embodiment of the present invention.

Referring to FIG. 7, UL frames of the new BS (i.e., 16m BS) and the new RS (i.e., 16m RS) are similar to the UL frames of the new BS (i.e., 16m BS) and the new RS (i.e., 16m RS) of FIG. 6. For example, legacy access zones 601 and 604 of FIG. 6 are substantially the same as legacy access zones 701 and 704 of FIG. 7, respectively. However, in the UL frames of the new BS (i.e., 16m BS) and the new RS (i.e., 16m RS), locations of an access zone and a relay zone within a new zone are opposite to their corresponding locations in FIG. 6. Accordingly, new access zones 602 and 605, and new relay zones 603 and 606 of FIG. 6 correspond to new access zones 703 and 706, and new relay zones 702 and 705 of FIG. 7, respectively.

Figure 8:
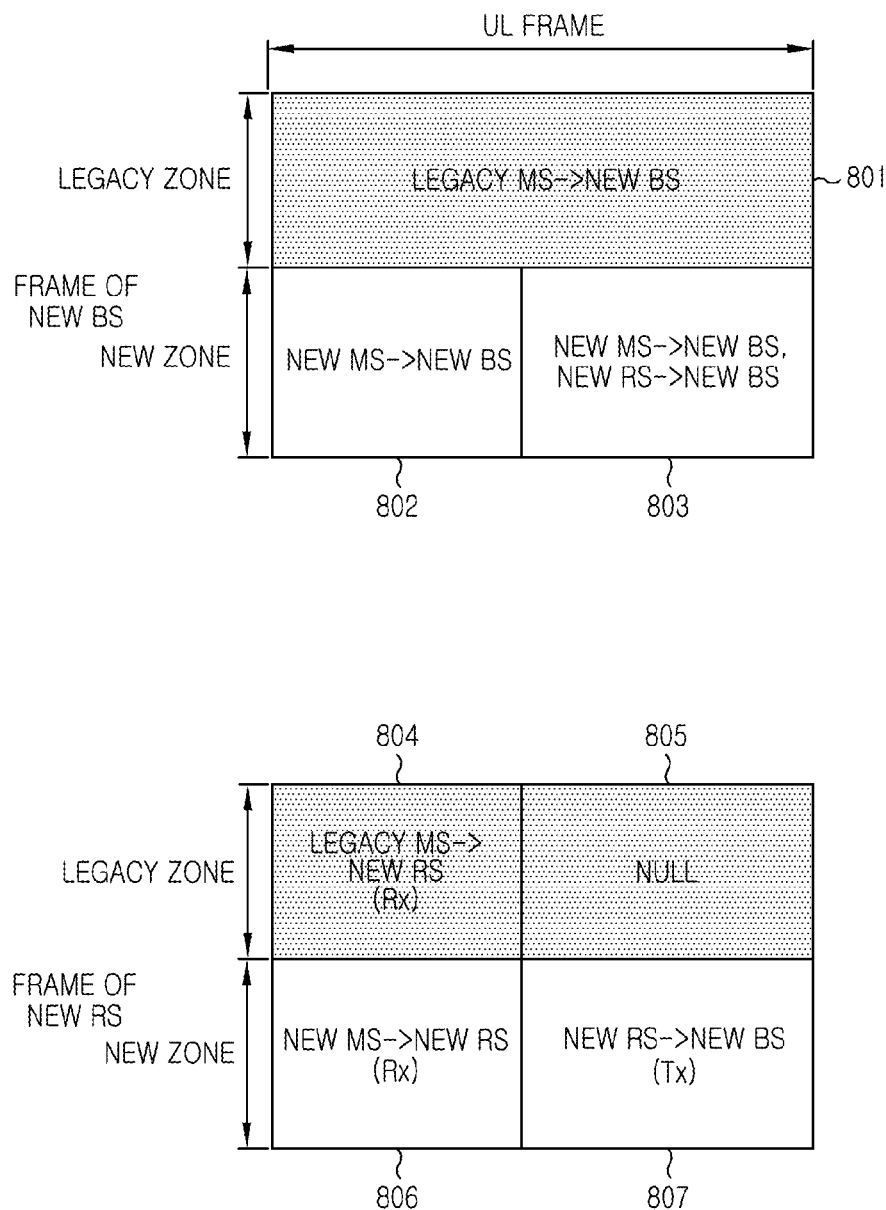
FIG. 8 illustrates a UL frame structure of a new BS and a new RS for providing services to both a new MS and a legacy MS in a multi-hop relay broadband wireless communication system according to still another exemplary embodiment of the present invention.

FIG. 8 illustrates a UL frame structure of a new BS and a new RS for providing services to both a new MS and a legacy MS in a multi-hop relay broadband wireless communication system according to still another exemplary embodiment of the present invention.

Referring to FIG. 8, a UL frame of the new BS (i.e., 16m BS) is divided into a legacy zone for communication with entities of a legacy wireless communication system and a new zone for communication with entities of substantially the same wireless communication system as the new BS. In this case, resources of a frequency domain are divided to be used by the legacy zone and the new zone. The new zone is divided into an access zone 802 and a relay zone 803. Resources of a time domain may be divided to be used by the access zone 802 and the relay zone 803. The legacy zone includes access zone 801, wherein the new BS (i.e., 16m BS) receives UL data from the legacy MS (i.e., 16e MS). In the access zone 802 of the new zone, the new BS (i.e., 16m BS) receives UL data from the new MS (i.e., 16m MS) corresponding to substantially the same wireless communication system as the new BS (i.e., 16m BS). In the relay zone 803 of the new zone, the new BS receives the UL data of the new MS (i.e., 16m MS) and UL data, which is used to provide a relay service to the new MS (i.e., 16m MS), not only from the new RS (i.e., 16m RS) but also from the new MS (i.e., 16m MS).

Similarly, a UL frame of the new RS (i.e., 16m RS) is divided into a legacy zone and a new zone. Resources of a frequency domain are divided to be used by the legacy zone and the new zone. The new zone may be divided into an access zone 806 and a relay zone 807. Resources of a time domain may be divided to be used by the access zone 806 and the relay zone 807. In the legacy zone, the new RS (i.e., 16m RS) receives UL data from the legacy MS (i.e., 16e MS). In the access zone 806 of the new zone, the new RS (i.e., 16m RS) receives data from the new MS (i.e., 16m MS). In the relay zone 807 of the new zone, the new RS transmits the UL data of the new MS (i.e., 16m MS) and UL data, which is used to provide a relay service to the new MS (i.e., 16m MS), to the new BS (i.e., 16m BS). In the legacy zone for the UL frame of the new RS (i.e., 16m RS), a duration corresponding to the relay zone 807 along the time domain is configured into a null zone 805. This is because the duration in which the new RS (i.e., 16m RS) transmits UL data to the new BS (i.e., 16m BS) may not be used as a relay zone where the new RS (i.e., 16m RS) receives UL data from the legacy MS (i.e., 16e MS). In the legacy zone for the UL frame of the new RS (i.e., 16m RS), a duration corresponding to the access zone 806 along the time domain is configured as an access zone 804.

Figure 9:
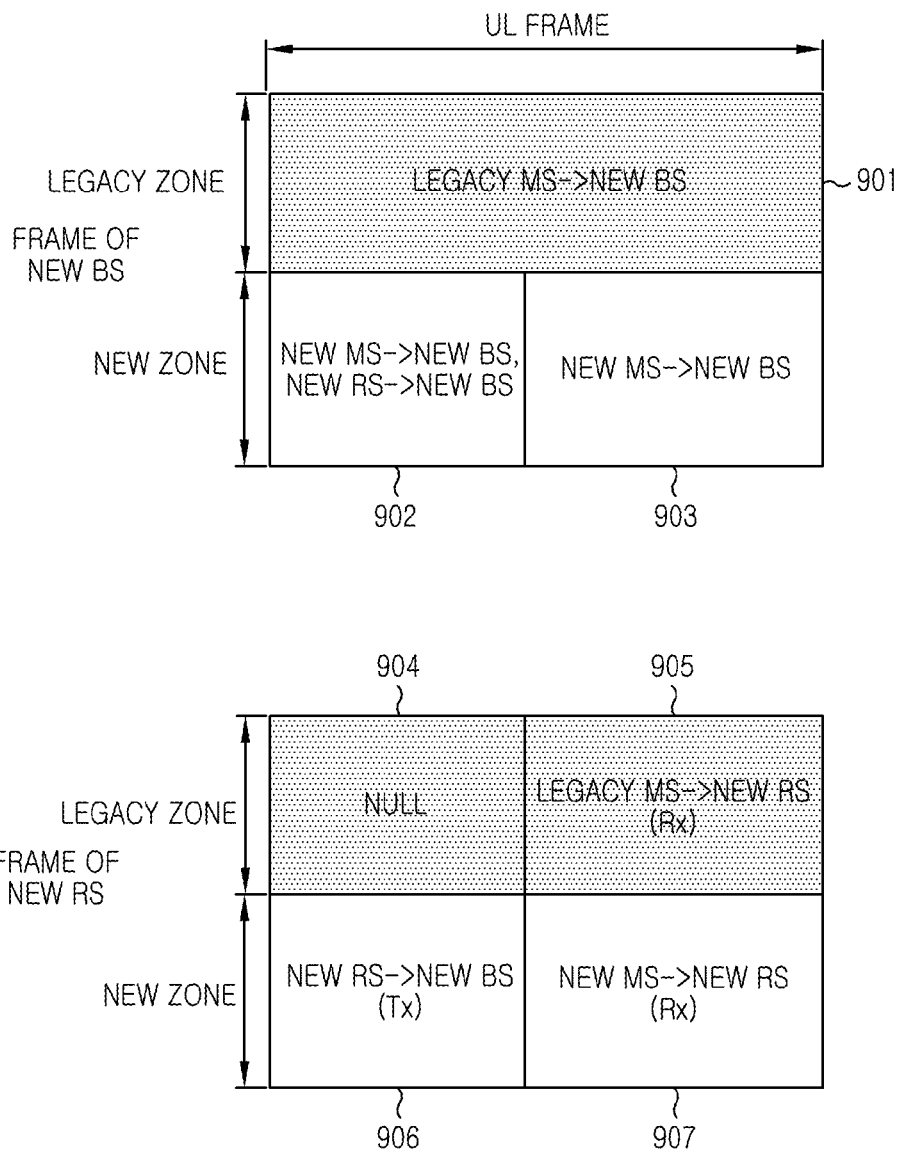
FIG. 9 illustrates a UL frame structure of a new BS and a new RS for providing services to both a new MS and a legacy MS in a multi-hop relay broadband wireless communication system according to yet another exemplary embodiment of the present invention.

FIG. 9 illustrates a UL frame structure of a new BS and a new RS for providing services to both a new MS and a legacy MS in a multi-hop relay broadband wireless communication system according to yet another exemplary embodiment of the present invention.

Referring to FIG. 9, UL frames of the new BS (i.e., 16m BS) and the new RS (i.e., 16m RS) are similar to the UL frames of the new BS (i.e., 16m BS) and the new RS (i.e., 16m RS) of FIG. 8. For example, legacy access zone 801 of FIG. 8 is substantially the same as legacy access zone 901 of FIG. 9.

However, in the UL frames of the new BS (i.e., 16m BS) and the new RS (i.e., 16m RS), locations of an access zone and a relay zone in a new zone are opposite to their corresponding locations in FIG. 8. In addition, in the UL frame of the new RS (i.e., 16m RS), locations of a null zone and a duration in which the new RS (i.e., 16m RS) receives UL data from the legacy MS (i.e., 16e MS) within the legacy zone are opposite to their corresponding locations in FIG. 8. Accordingly, new access zones 802 and 806, new relay zones 803 and 807, legacy access zone 804, and null zone 805 of FIG. 8 correspond to new access zones 903 and 907, new relay zones 902 and 906, legacy access zone 905 and null zone 904 of FIG. 9, respectively.

In FIG. 8 and FIG. 9, the frame of the new RS includes an unusable resource region. In order to transmit data by using the unusable resource region, a frame structure of FIG. 10 and FIG. 11 is provided.

Figure 10:
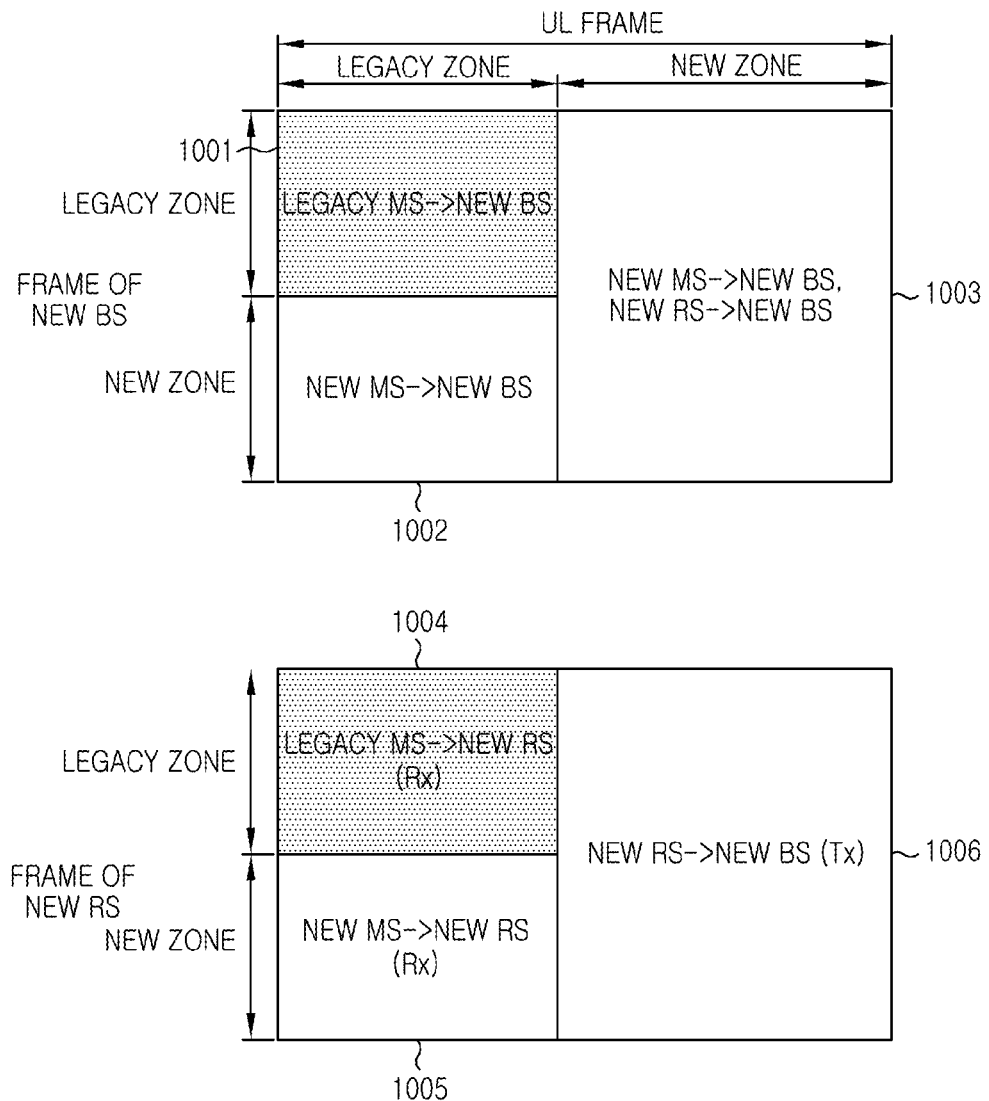
FIG. 10 illustrates a UL frame structure of a new BS and a new RS for providing services to both a new MS and a legacy MS in a multi-hop relay broadband wireless communication system according to still another exemplary embodiment of the present invention.
Figure 11:
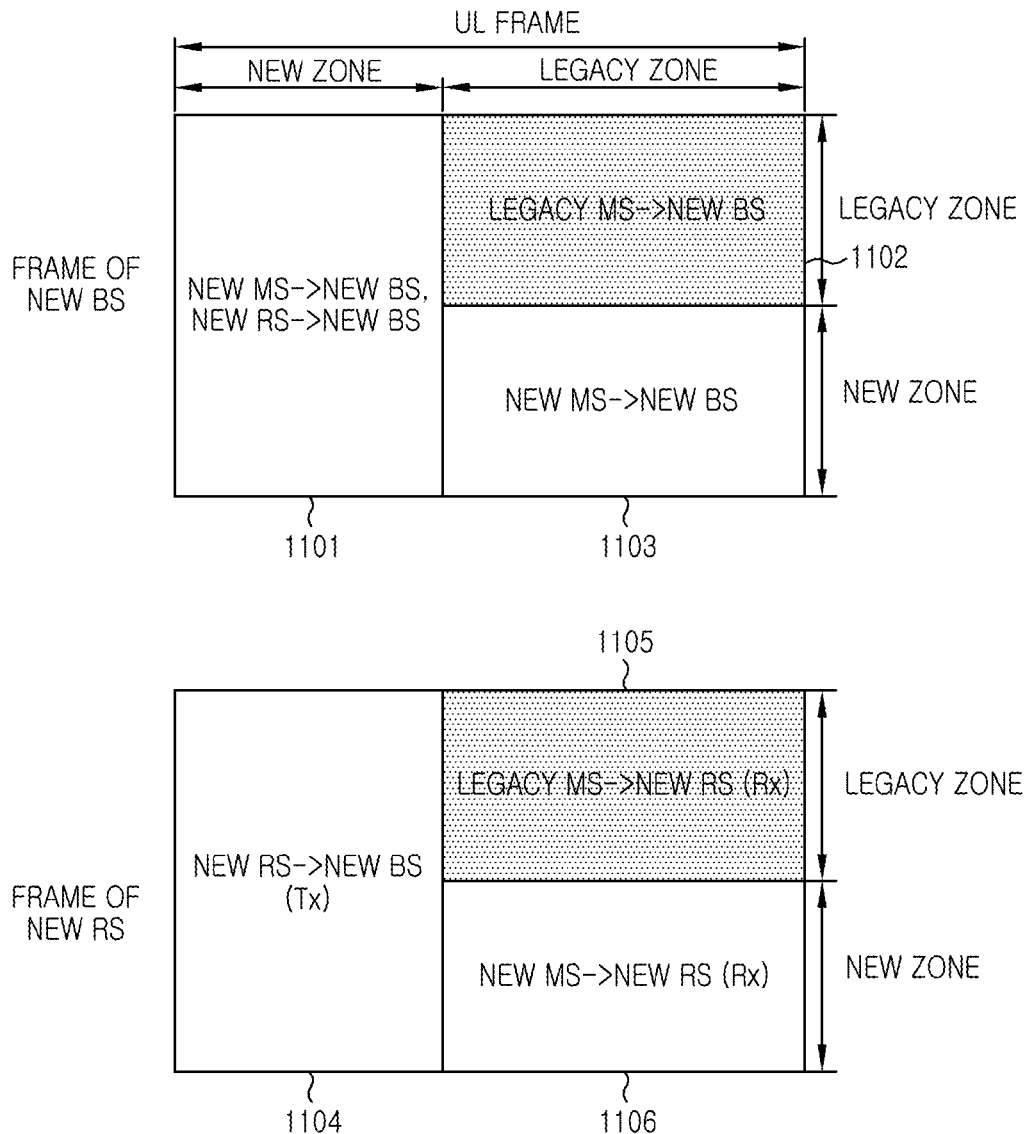
FIG. 11 illustrates a UL frame structure of a new BS and a new RS for providing services to both a new MS and a legacy MS in a multi-hop relay broadband wireless communication system according to yet another exemplary embodiment of the present invention.

FIG. 10 illustrates a UL frame structure of a new BS and a new RS for providing services to both a new MS and a legacy MS in a multi-hop relay broadband wireless communication system according to still another exemplary embodiment of the present invention.

Referring to FIG. 10, a UL frame of the new BS (i.e., 16m BS) is divided into a legacy zone for communication with entities of a legacy wireless communication system and a new zone for communication with entities of substantially the same wireless communication system as the new BS. Resources of a frequency domain and a time domain are divided to be used by the legacy zone and the new zone. The resources of the time domain are divided to be used by the legacy zone and the new zone. In this case, the new zone is configured to be used as a relay zone 1003. The resources of the frequency domain are divided so that the legacy zone is configured to be used as a legacy access zone 1001 and an access zone 1002 of the new zone. In the legacy access zone 1001, the new BS (i.e., 16m BS) receives UL data from the legacy MS (i.e., 16e MS). In the access zone 1002 of the new zone, the new BS (i.e., 16m BS) receives UL data from the new MS (i.e., 16m MS) corresponding to substantially the same wireless communication system as the new BS (i.e., 16m BS). In the relay zone 1003 of the new zone, the new BS receives the UL data of the new MS (i.e., 16m MS) and UL data, which is used to provide a relay service to the new MS (i.e., 16m MS), not only from the new RS (i.e., 16m RS) but also from the new MS (i.e., 16m MS).

Similarly, a UL frame of the new RS (i.e., 16m RS) is divided into a legacy zone and a new zone. Resources of a frequency domain and a time domain are divided to be used by the legacy zone and the new zone. The resources of the time domain are divided to be used by the legacy zone and the new zone. In this case, the new zone is configured to be used as a relay zone 1006. The resources of the frequency domain are divided so that the legacy zone is configured to be used as a legacy access zone 1004 and an access zone 1005 of the new zone. In the legacy access zone 1004, the new RS (i.e., 16m RS) receives UL data from the legacy MS (i.e., 16e MS). In the access zone 1005 of the new zone, the new RS (i.e., 16m RS) receives data from the new MS (i.e., 16m MS). In the relay zone 1006 of the new zone, the new RS transmits the UL data of the new MS (i.e., 16m MS) and UL data, which is used to provide a relay service to the new MS (i.e., 16m MS), to the new BS (i.e., 16m BS). Accordingly, the null zone 805 of FIG. 8 may be avoided, and data may be transmitted in a corresponding duration.

FIG. 11 illustrates a UL frame structure of a new BS and a new RS for providing services to both a new MS and a legacy MS in a multi-hop relay broadband wireless communication system according to yet another exemplary embodiment of the present invention.

Referring to FIG. 11, UL frames of the new BS (i.e., 16m BS) and the new RS (i.e., 16m RS) are similar to the UL frames of the new BS (i.e., 16m BS) and the new RS (i.e., 16m RS) of FIG. 10. However, in the UL frames of the new BS (i.e., 16m BS) and the new RS (i.e., 16m RS), locations of a legacy zone and a new zone divided along a time domain are opposite to their corresponding locations in FIG. 10. Accordingly, legacy access zones 1001 and 1004, new access zones 1002 and 1005, and new relay zones 1003 and 1006 of FIG. 10 correspond to legacy access zones 1102 and 1105, new access zones 1103 and 1106, and new relay zones 1101 and 1104 of FIG. 11, respectively.

Meanwhile, the aforementioned DL and UL frame structures may be used to configure a physical frame of a new BS or a new RS. The physical frame may be configured by combining all possible cases of the aforementioned UL and DL frames.

Figure 12:
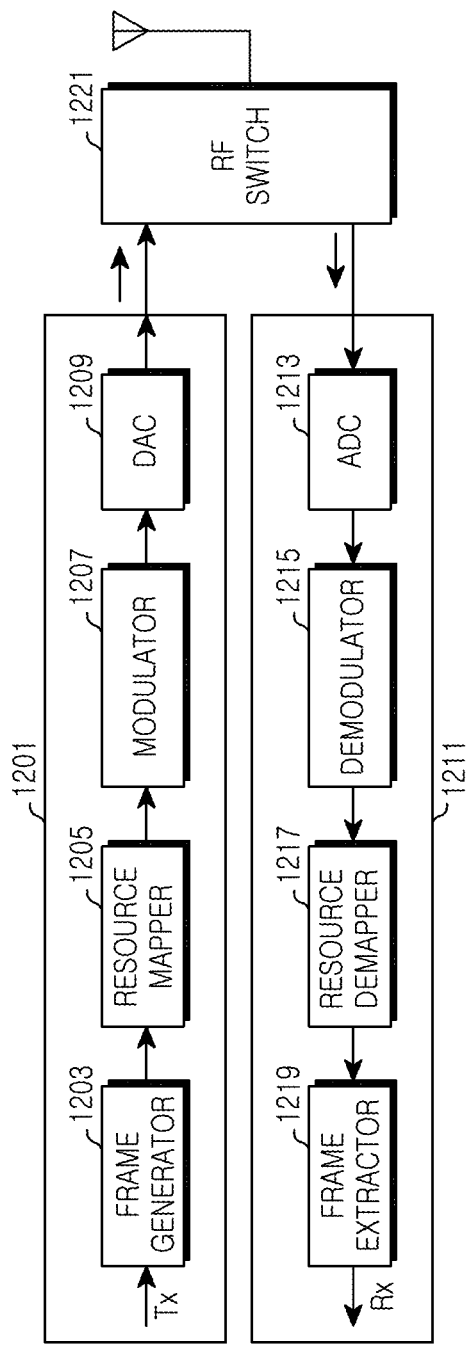
FIG. 12 is a block diagram illustrating a structure of a new BS or a new RS according to an exemplary embodiment of the present invention.

FIG. 12 is a block diagram illustrating a structure of a new BS or a new RS according to an exemplary embodiment of the present invention.

Referring to FIG. 12, the new BS or the new RS includes a transmitter 1201, a receiver 1211, and a Radio Frequency (RF) switch 1221. The transmitter 1201 includes a frame generator 1203, a resource mapper 1205, a modulator 1207, and a Digital/Analog Converter (DAC) 1209. The receiver 1211 includes an Analog/Digital Converter (ADC) 1213, a demodulator 1215, a resource demapper 1217, and a frame extractor 1219.

The frame generator 1203 generates data to be transmitted in each zone within a frame, and then generates frames by the use of the generated data. For example, in a case of the new BS, the frame generator 1203 generates DL data to be transmitted to a legacy MS in a legacy zone, generates DL data to be transmitted to a new MS in an access zone of a new zone, generates DL data to be transmitted to the new RS in a relay zone of the new zone, and then generates a DL frame by using the generated data. In a case of the new RS, the frame generator 1203 generates DL data to be transmitted to the legacy MS in the legacy zone, generates a DL frame by generating DL data to be transmitted to the new MS in the access zone of the new zone, and generates a UL frame by generating UL data to be transmitted to the new BS in the relay zone of the new zone.

The resource mapper 1205 allocates a frame, provided from the frame generator 1203, to a burst of a link allocated to that frame.

The modulator 1207 receives the frame allocated to the burst of the link from the resource mapper 1205, and modulates the frame according to a predefined modulation scheme.

The DAC 1209 converts a digital signal modulated by the modulator 1207 into an analog signal, and then converts the analog signal into an RF signal. Thereafter, the DAC 1209 transmits the RF signal through an antenna under the control of the RF switch 1221.

The ADC 1213 converts the signal received through the antenna into a baseband signal under the control of the RF switch 1221, and then converts the converted baseband analog signal into a digital signal.

The demodulator 1215 demodulates the digital signal provided from the ADC 1213 according to a predefined demodulation scheme.

The resource demapper 1217 extracts an actual frame allocated to the burst of the link from the signal provided from the demodulator 1215.

The frame extractor 1219 extracts and analyzes data received in each zone within a frame from the frame provided from the resource demapper 1217. For example, in a case of the new BS, the frame extractor 1219 extracts UL data, which is received from the legacy MS in a legacy zone, from the UL frame, extracts UL data received from the new MS in an access zone of a new zone, and extracts UL data received from the new RS in a relay zone of the new zone. In a case of the new RS, the frame extractor 1219 extracts UL data, which is received from the legacy MS in the legacy zone, from the UL frame, extracts UL data, which is received from the new MS in the access zone of the new zone, and extracts DL data, which is received from the new BS in the relay zone of the new zone, from the DL frame.

The RF switch 1221 connects the transmitter 1201 and the receiver 1211 to the antenna according to a Transmit (Rx) band and a Receive (Rx) band of the frame.

Figure 13:
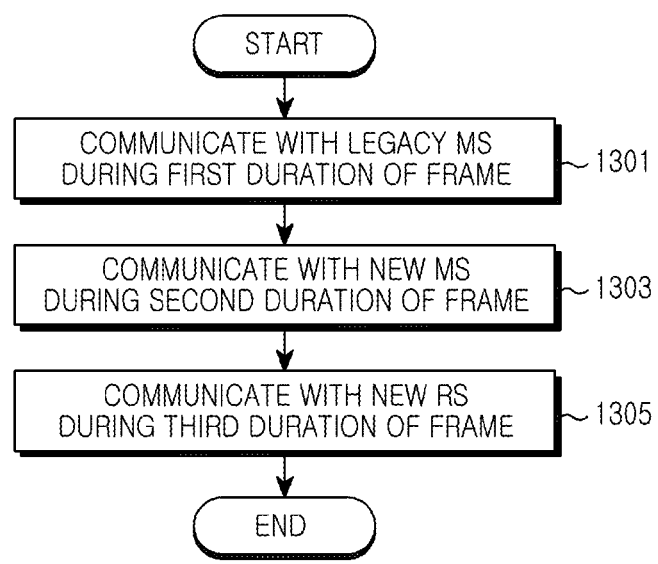
FIG. 13 is a flowchart illustrating a method of transmitting and receiving data of a new BS in a broadband wireless communication system employing heterogeneous systems according to an exemplary embodiment of the present invention.

FIG. 13 is a flowchart illustrating a method of transmitting and receiving data of a new BS in a broadband wireless communication system employing heterogeneous systems according to an exemplary embodiment of the present invention. As illustrated in FIG. 2 and FIG. 5, an operation of FIG. 13 described below assumes that a legacy zone, an access zone of a new zone, and a relay zone of the new zone are divided in a time division manner.

Referring to FIG. 13, the new BS determines whether DL or UL communication is initiated, and if communication is initiated, the new BS performs communication with a legacy MS during a first duration (i.e., the legacy zone) of a frame in step 1301. In a case of DL communication, the new BS generates Tx data of the legacy zone, and transmits the Tx data to the legacy MS by mapping the Tx data on the legacy zone. In a case of UL communication, the new BS extracts Rx data received from the legacy MS in the legacy zone, and analyzes the extracted Rx data.

In step 1303, the new BS communicates with a new MS during a second duration (i.e., the access zone of the new zone). In a case of DL communication, the new BS generates Tx data of the access zone of the new zone, and transmits the Tx data to the new MS by mapping the generated Tx data to the access zone of the new zone. In a case of UL communication, the new BS extracts Rx data received from the new MS in the access zone of the new zone, and analyzes the extracted Rx data.

In step 1305, the new BS communicates with a new RS during a third duration (i.e., the relay zone of the new zone) of the frame. In a case of DL communication, the new BS generates Tx data of the relay zone of the new zone, and transmits the Tx data to the new RS by mapping the generated Tx data to the relay zone of the new zone. In a case of UL communication, the new BS extracts Rx data received from the new RS in the relay zone of the new zone, and analyzes the extracted Rx data.

Thereafter, the procedure of FIG. 13 ends.

In another exemplary embodiment, as illustrated in FIG. 3 and FIG. 6, the new BS may communicate with not only with the new RS but also with the new MS in the third duration (i.e., the relay zone of the new zone). Alternatively, as illustrated in FIG. 4 and FIG. 7, a location of the second duration (i.e., the access zone of the new zone) within the frame may be opposite to a location of the third duration (i.e., the relay zone of the new zone).

Figure 14:
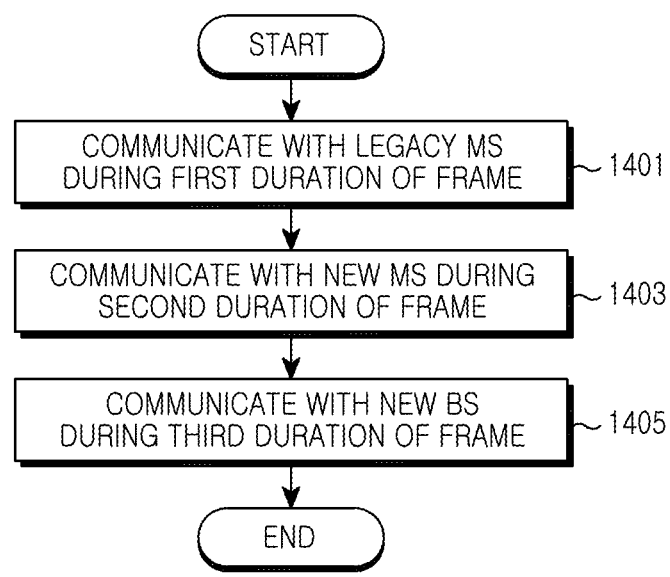
FIG. 14 is a flowchart illustrating a method of transmitting and receiving data of a new RS in a broadband wireless communication system employing heterogeneous systems according to an exemplary embodiment of the present invention.

FIG. 14 is a flowchart illustrating a method of transmitting and receiving data of a new RS in a broadband wireless communication system employing heterogeneous systems according to an exemplary embodiment of the present invention. As illustrated in FIGS. 2 and 3 and FIGS. 5 and 6, an operation of FIG. 14 described below assumes that a legacy zone, an access zone of a new zone, and a relay zone of the new zone are divided in a time division manner.

Referring to FIG. 14, the new RS determines whether DL or UL communication is initiated, and if communication is initiated, the new RS performs communication with a legacy MS during a first duration (i.e., the legacy zone) of a frame in step 1401. In a case of DL communication, the new RS generates Tx data of the legacy zone, and transmits the Tx data to the legacy MS by mapping the Tx data on the legacy zone. In a case of UL communication, the new RS extracts Rx data received from the legacy MS in the legacy zone, and analyzes the extracted Rx data.

In step 1403, the new RS communicates with a new MS during a second duration (i.e., the access zone of the new zone). In a case of DL communication, the new RS generates Tx data of the access zone of the new zone, and transmits the Tx data to the new MS by mapping the generated Tx data to the access zone of the new zone. In a case of UL communication, the new RS extracts Rx data received from the new MS in the access zone of the new zone, and analyzes the extracted Rx data.

In step 1405, the new RS communicates with a new BS during a third duration (i.e., the relay zone of the new zone) of the frame. In a case of DL communication, the new RS extracts Rx data received from the new BS in the relay zone of the new zone, and analyzes the extracted Rx data. In a case of UL communication, the new RS generates Tx data of the relay zone of the new zone, and transmits the Tx data to the new BS by mapping the generated Tx data to the relay zone of the new zone.

In another exemplary embodiment, as illustrated in FIG. 4 and FIG. 7, a location of the second duration (i.e., the access zone of the new zone) within the frame may be opposite to a location of the third duration (i.e., the relay zone of the new zone).

Figure 15:
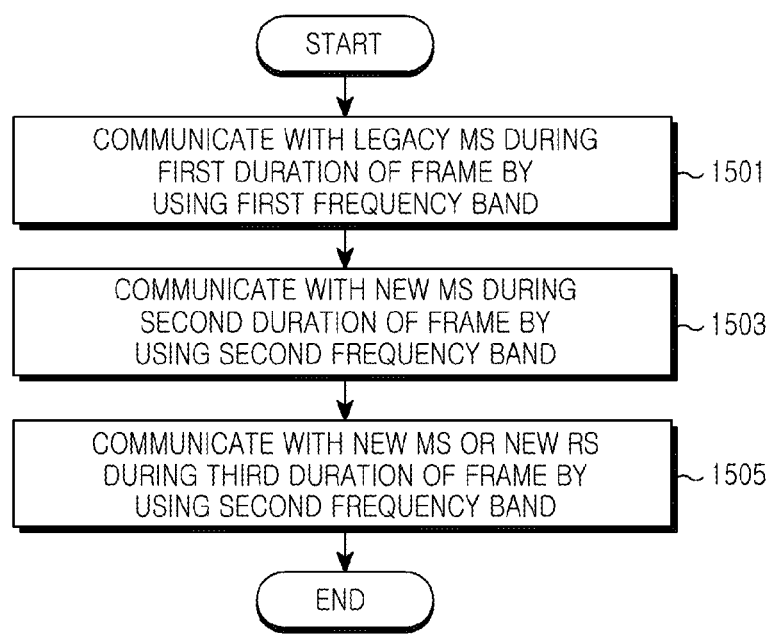
FIG. 15 is a flowchart illustrating a method of transmitting and receiving data of a new BS in a broadband wireless communication system employing heterogeneous systems according to another exemplary embodiment of the present invention.

FIG. 15 is a flowchart illustrating a method of transmitting and receiving data of a new BS in a broadband wireless communication system employing heterogeneous systems according to another exemplary embodiment of the present invention. As illustrated in FIG. 8, an operation of FIG. 15 described below assumes that a legacy zone and a new zone are divided in a frequency division manner.

Referring to FIG. 15, the new BS determines whether UL communication is initiated, and if communication is initiated, the new BS divides data into data of the legacy zone and data of the new zone in a frequency division manner and then processes the divided data.

The data of the legacy zone is processed as follows. In step 1501, the new BS communicates with a legacy MS by using a first frequency band during a first duration (i.e., a legacy zone) of a frame. In other words, the new BS extracts Rx data received from the legacy MS in the legacy zone, and analyzes the extracted Rx data.

The data of the new zone is processed as follows. In step 1503, the new BS communicates with a new MS by using a second frequency band during a second duration (i.e., an access zone of a new zone) of the frame. In other words, the new BS extracts Rx data received from the new MS in the access zone of the new zone, and analyzes the extracted Rx data. In step 1505, the new BS communicates with the new MS or a new RS by using the second frequency band during a third duration (i.e., the relay zone of the new zone) of the frame. In other words, the new BS extracts Rx data received from the new MS or the new RS in the relay zone of the new zone, and analyzes the extracted Rx data.

In another exemplary embodiment, as illustrated in FIG. 9, a location of the second duration (i.e., the access zone of the new zone) may be opposite to a location of the third duration (i.e., the relay zone of the new zone).

Figure 16:
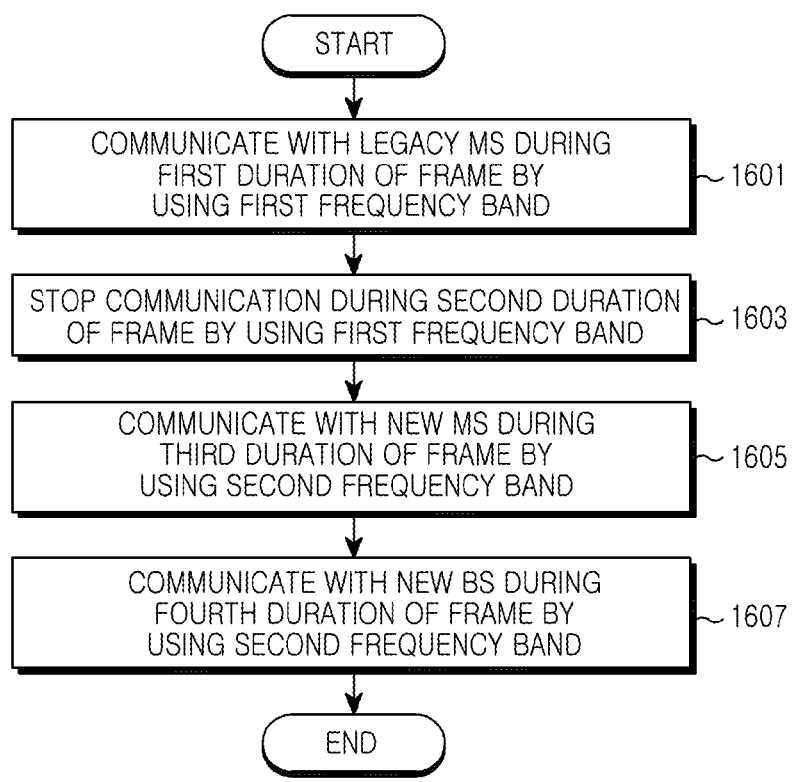
FIG. 16 is a flowchart illustrating a method of transmitting and receiving data of a new RS in a broadband wireless communication system employing heterogeneous systems according to another exemplary embodiment of the present invention.

FIG. 16 is a flowchart illustrating a method of transmitting and receiving data of a new RS in a broadband wireless communication system employing heterogeneous systems according to another exemplary embodiment of the present invention. As illustrated in FIG. 8, an operation of FIG. 16 described below assumes that a legacy zone and a new zone are divided in a frequency division manner, and the new RS does not use some parts of a frequency domain.

Referring to FIG. 16, the new RS determines whether UL communication is initiated, and if communication is initiated, the new RS divides data into data of the legacy zone and data of the new zone in a frequency division manner and then processes the divided data.

The data of the legacy zone is processed as follows. In step 1601, the new RS communicates with a legacy MS by using a first frequency band during a first duration (i.e., a legacy zone) of a frame. In other words, the new RS extracts Rx data received from the legacy MS in the legacy zone, and analyzes the extracted Rx data. In step 1603, during a second duration (i.e., a null zone) of the frame, the new RS does not perform communication using the first frequency band.

The data of the new zone is processed as follows. In step 1605, the new RS communicates with a new MS by using a second frequency band during a third duration (i.e., an access zone of a new zone) of the frame. That is, the new RS extracts Rx data received from the new MS in the access zone of the new zone, and analyzes the extracted Rx data. In step 1607, the new RS communicates with a new BS by using the second frequency band during a fourth duration (i.e., the relay zone of the new zone) of the frame. That is, the new RS generates Tx data of the relay zone of the new zone, and transmits the Tx data to the new BS by mapping the generated Tx data to the relay zone of the new zone.

In another exemplary embodiment, as illustrated in FIG. 9, a location of the first duration (i.e., the relay zone) within the frame may be opposite to a location of the second duration (i.e., the null zone), and a location of the third duration (i.e., the access zone of the new zone) may be opposite to a location of the fourth duration (i.e., the relay zone of the new zone).

Figure 17:
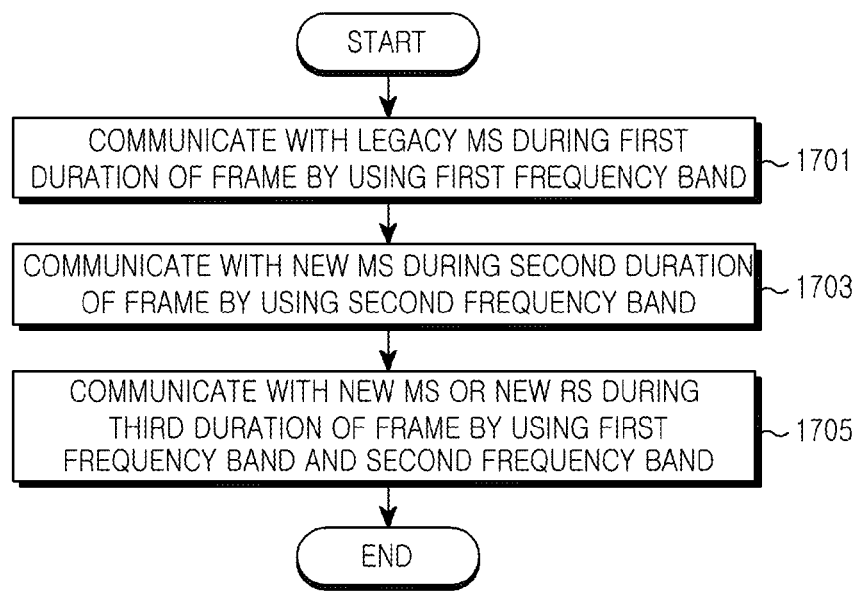
FIG. 17 is a flowchart illustrating a method of transmitting and receiving data of a new BS in a broadband wireless communication system employing heterogeneous systems according to yet another exemplary embodiment of the present invention.

FIG. 17 is a flowchart illustrating a method of transmitting and receiving data of a new BS in a broadband wireless communication system employing heterogeneous systems according to yet another exemplary embodiment of the present invention. As illustrated in FIG. 10, an operation of FIG. 17 described below assumes that a legacy zone and a new zone are divided in a time division manner and a frequency division manner.

Referring to FIG. 17, the new BS determines whether UL communication is initiated, and if communication is initiated, the new BS divides data into data of the legacy zone and data of the new zone in a frequency division manner and then processes the divided data. The data of the legacy zone is processed as follows. In step 1701, the new BS communicates with a legacy MS by using a first frequency band during a first duration (i.e., a legacy zone) of a frame. In other words, the new BS extracts Rx data received from the legacy MS in the legacy zone, and analyzes the extracted Rx data. The data of the new zone is processed as follows. In step 1703, the new BS communicates with a new MS by using a second frequency band during a second duration (i.e., an access zone of a new zone) of the frame. In other words, the new BS extracts Rx data received from the new MS in the access zone of the new zone, and analyzes the extracted Rx data.

Thereafter, the new BS processes the data of the new zone. That is, in step 1705, the new BS communicates with the new MS or a new RS by using the first frequency band and the second frequency band during a third duration of the frame. In other words, the new BS extracts Rx data received from the new MS or the new RS in the relay zone of the new zone, and analyzes the extracted Rx data.

In another exemplary embodiment, as illustrated in FIG. 11, locations of the first duration (i.e., the relay zone) and the second duration (i.e., the access zone of the new zone) within the frame may be opposite to a location of the third duration (i.e., the relay zone of the new zone).

Figure 18:
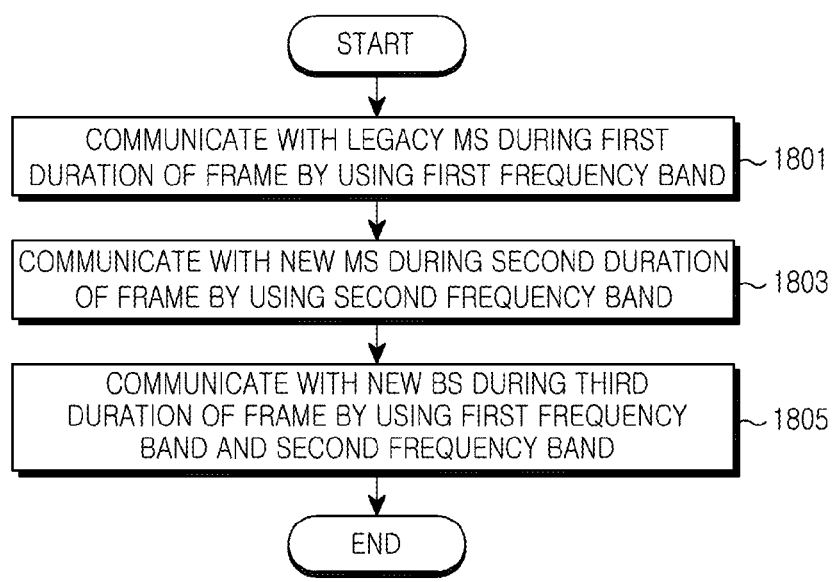
FIG. 18 is a flowchart illustrating a method of transmitting and receiving data of a new RS in a broadband wireless communication system employing heterogeneous systems according to yet another exemplary embodiment of the present invention.

FIG. 18 is a flowchart illustrating a method of transmitting and receiving data of a new RS in a broadband wireless communication system employing heterogeneous systems according to yet another exemplary embodiment of the present invention. As illustrated in FIG. 10, an operation of FIG. 18 described below assumes that a legacy zone and a new zone are divided in a time division manner and a frequency division manner.

Referring to FIG. 18, the new RS determines whether UL communication is initiated, and if communication is initiated, the new RS divides data into data of the legacy zone and data of the new zone in a frequency division manner and then processes the divided data. The data of the legacy zone is processed as follows. In step 1801, the new RS communicates with a legacy MS by using a first frequency band during a first duration (i.e., a legacy zone) of a frame. In other words, the new RS extracts Rx data received from the legacy MS in the legacy zone, and analyzes the extracted Rx data. The data of the new zone is processed as follows. In step 1803, the new RS communicates with a new MS by using a second frequency band during a second duration (i.e., an access zone of a new zone) of the frame. That is, the new RS extracts Rx data received from the new MS in the access zone of the new zone, and analyzes the extracted Rx data.

Thereafter, the new RS processes the data of the new zone. In step 1805, the new RS communicates with a new BS by using the first frequency band and the second frequency band during a third duration (i.e., the relay zone of the new zone) of the frame. That is, the new RS generates Tx data of the relay zone of the new zone, and transmits the Tx data to the new BS by mapping the generated Tx data to the relay zone of the new zone.

In another exemplary embodiment, as illustrated in FIG. 11, locations of the first duration (i.e., the relay zone) and the second duration (i.e., the access zone of the new zone) within the frame may be opposite to a location of the third duration (i.e., the relay zone of the new zone).

According to exemplary embodiments of the present invention, a multi-hop relay broadband wireless communication system defines a frame structure capable of providing a communication service when entities of heterogeneous systems coexist. Therefore, there is an advantage in that data services may be effectively provided to all MSs corresponding to the heterogeneous systems.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of transmitting and receiving an UpLink (UL) frame of a Base Station (BS) in a multi-hop relay wireless communication system using OFDMA (Orthogonal Frequency Division Multiple Access) scheme employing heterogeneous systems, wherein the UL frame of the BS comprises a legacy zone for communication with a legacy Mobile Station (MS), an access zone of a new zone for communication with a new MS, and a relay zone of a new zone for communication with a new Relay Station (RS), the method comprising:

receiving UL data from the legacy MS in the legacy zone;

receiving the UL data from the new MS in the access zone of the new zone; and receiving the UL data from the new RS in the relay zone of the new zone, wherein the heterogeneous systems include a legacy system for supporting the legacy MS and a new system for supporting the new MS and the new RS and the new system is evolved from the legacy system with supporting compatibility of the legacy system, wherein, in the UL frame, the legacy zone and the new zone are divided in a frequency division manner, and the divided new zone is divided in a time division manner into an access zone and a relay zone, and wherein, in the legacy zone, a duration corresponding to the relay zone of the new zone along a time domain is configured into a null zone.

2. The method of claim 1, wherein, in the UL frame, the legacy zone, the access zone of the new zone, and the relay zone of the new zone are divided in a time division manner.

3. The method of claim 1, further comprising receiving the UL data from the new MS in the relay zone of the new zone.

4. The method of claim 1, wherein, in the UL frame, the legacy zone and the relay zone of the new zone are divided in a time division manner, and the divided legacy zone is divided in a frequency division manner into a legacy zone and an access zone of the new zone.

5. A method of transmitting and receiving an UpLink (UL) frame of a Relay Station (RS) in a multi-hop relay wireless communication system using OFDMA (Orthogonal Frequency Division Multiple Access) scheme employing heterogeneous systems, wherein the UL frame of the RS comprises a legacy zone for communication with a legacy Mobile Station (MS), an access zone of a new zone for communication with a new MS, and a relay zone of a new zone for communication with a new Base Station (BS), the method comprising:

receiving UL data from the legacy MS in the legacy zone;

receiving the UL data from the new MS in the access zone of the new zone; and transmitting the UL data, which is to be delivered to the new MS, to the new BS in the relay zone of the new zone, wherein the heterogeneous systems include a legacy system for supporting the legacy MS and a new system for supporting the new MS and the new BS and the new system is evolved from the legacy system with supporting compatibility of the legacy system, wherein, in the UL frame, the legacy zone and the new zone are divided in a frequency division manner, and the divided new zone is divided in a time division manner into the access zone and the relay zone, and wherein, in the legacy zone, a duration corresponding to the relay zone of the new zone along a time domain is configured into a null zone.

6. The method of claim 5, wherein, in the UL frame, the legacy zone, the access zone of the new zone, and the relay zone of the new zone are divided in a time division manner.

7. The method of claim 5, wherein, in the UL frame, the legacy zone and the relay zone of the new zone are divided in a time division manner, and the divided legacy zone is divided in a frequency division manner into a legacy zone and an access zone of the new zone.

8. An apparatus for transmitting and receiving an UpLink (UL) frame of a Base Station (BS) in a multi-hop relay wireless communication system using OFDMA (Orthogonal Frequency Division Multiple Access) scheme employing heterogeneous systems, wherein the UL frame of the BS comprises a legacy zone for communication with a legacy Mobile Station (MS), an access zone of a new zone for communication with a new MS, and a relay zone of a new zone for communication with a new Relay Station (RS), the apparatus comprising:

a receiver for receiving data; and a frame extractor for extracting UL data received from the legacy MS in the legacy zone, for extracting UL data received from the new MS in the access zone of the new zone, and for extracting UL data received from the new RS in the relay zone of the new zone, from the received data, wherein the heterogeneous systems include a legacy system for supporting the legacy MS and a new system for supporting the new MS and the new RS and the new system is evolved from the legacy system with supporting compatibility of the legacy system, wherein, in the UL frame, the legacy zone and the new zone are divided in a frequency division manner, and the divided new zone is divided in a time division manner into an access zone and a relay zone, and wherein, in the legacy zone, a duration corresponding to the relay zone of the new zone along a time domain is configured into a null zone.

9. The apparatus of claim 8, wherein, in the UL frame, the legacy zone, the access zone of the new zone, and the relay zone of the new zone are divided in a time division manner.

10. The apparatus of claim 8, wherein the frame extractor extracts the UL data received from the new MS in the relay zone of the new zone.

11. The apparatus of claim 8, wherein, in the UL frame, the legacy zone and the relay zone of the new zone are divided in a time division manner, and the divided legacy zone is divided in a frequency division manner into a legacy zone and an access zone of the new zone.

12. An apparatus for transmitting and receiving an UpLink (UL) frame of a Relay Station (RS) in a multi-hop relay wireless communication system using OFDMA (Orthogonal Frequency Division Multiple Access) scheme employing heterogeneous systems, wherein the UL frame of the RS comprises a legacy zone for communication with a legacy Mobile Station (MS), an access zone of a new zone for communication with a new MS, and a relay zone of a new zone for communication with a new Base Station (BS), the apparatus comprising:

a receiver for receiving data;

a frame extractor for extracting UL data received from the legacy MS in the legacy zone and for extracting UL data received from the new MS in the access zone of the new zone, from the received data; and a transmitter for transmitting the UL data, which is received from the new MS, to the new BS in the relay zone of the new zone, wherein the heterogeneous systems include a legacy system for supporting the legacy MS and a new system for supporting the new MS and the new BS and the new system is evolved from the legacy system with supporting compatibility of the legacy system, wherein, in the UL frame, the legacy zone and the new zone are divided in a frequency division manner, and the divided new zone is divided in a time division manner into the access zone and the relay zone, and wherein, in the legacy zone, a duration corresponding to the relay zone of the new zone along a time domain is configured into a null zone.

13. The apparatus of claim 12, wherein, in the UL frame, the legacy zone, the access zone of the new zone, and the relay zone of the new zone are divided in a time division manner.

14. The apparatus of claim 12, wherein, in the UL frame, the legacy zone and the relay zone of the new zone are divided in a time division manner, and the divided legacy zone is divided in a frequency division manner into a legacy zone and an access zone of the new zone.

\* \* \* \* \*